(12) United States Patent
Kennedy, III (10) Patent No.: US 9,446,290 B2
(45) Date of Patent: Sep. 20, 2016

(54) GOLF BALL AND METHOD OF COATING A COVER OF THE GOLF BALL

(71) Applicant: NIKE, Inc., Beaverton, OR (US)

(72) Inventor: Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 250 days.

(21) Appl. No.: 14/160,013

(22) Filed: Jan. 21, 2014

(65) Prior Publication Data
US 2015/0202498 A1    Jul. 23, 2015

(51) Int. Cl.
| | |
|---|---|
| *A63B 37/06* | (2006.01) |
| *A63B 37/12* | (2006.01) |
| *A63B 45/02* | (2006.01) |
| *A63B 37/00* | (2006.01) |
| *C09D 175/04* | (2006.01) |
| *C08K 5/098* | (2006.01) |

(52) U.S. Cl.
CPC ........... *A63B 45/02* (2013.01); *A63B 37/0022* (2013.01); *C08K 5/098* (2013.01); *C09D 175/04* (2013.01); *A63B 37/0018* (2013.01); *A63B 37/0075* (2013.01); *A63B 37/0076* (2013.01)

(58) Field of Classification Search
USPC ................................................ 473/351–378
See application file for complete search history.

(56) References Cited

U.S. PATENT DOCUMENTS

| | | | | |
|---|---|---|---|---|
| 3,940,146 | A | * | 2/1976 | Little ................ A63B 37/0003 260/998.14 |
| 4,073,983 | A | * | 2/1978 | Van Cleave ............ B05D 5/08 114/67 A |
| 4,725,506 | A | * | 2/1988 | Nagano .................... C08F 8/20 428/412 |
| 5,227,198 | A | | 7/1993 | Laura et al. |
| 5,300,363 | A | | 4/1994 | Laura et al. |
| 5,461,109 | A | | 10/1995 | Blair et al. |
| 5,516,843 | A | | 5/1996 | Scholl |

(Continued)

FOREIGN PATENT DOCUMENTS

| | | | |
|---|---|---|---|
| JP | 2002136620 A | * | 5/2002 |
| JP | 2005342165 A | * | 12/2005 |

OTHER PUBLICATIONS

Maria D. Romero-Sanchez and Jose Miguel Martin-Martinez,Treatment of vulcanized styrene-butadiene rubber (SBR) with mixtures of Trichloroisocyanuric Acid and Fumaric Acid, The Journal of Adhesion, Sep. 8, 2010, pp. 1111-1133, 79:12, Taylor & Francis Informa Ltd, London, UK.

(Continued)

*Primary Examiner* — Alvin Hunter
(74) *Attorney, Agent, or Firm* — Honigman Miller Schwartz and Cohn LLP (57) ABSTRACT

A golf ball comprises a core, a cover formed from an ionomer resin and disposed on the core, and a cured coating layer disposed on and in direct contact with the cover. The cured coating layer is formed from a topcoat coating composition comprising a polymeric component and a halogenated component. The halogenated component is present in an amount of from about 0.5 parts by weight to about 50 parts by weight based on 100 parts by weight of the polymeric component. A method of coating a cover of a golf ball includes applying the topcoat coating composition directly onto the cover. The method also includes, after applying, curing the topcoat coating composition to form a cured coating layer disposed on and in direct contact with the cover to thereby coat the cover.

14 Claims, 3 Drawing Sheets

(56) References Cited

U.S. PATENT DOCUMENTS

| | | | | |
|---|---|---|---|---|
| 5,620,747 | A | 4/1997 | Laura et al. | |
| 5,629,046 | A | 5/1997 | Laura et al. | |
| 5,744,549 | A * | 4/1998 | Lutz | A63B 37/0003 427/393.5 |
| 5,817,735 | A * | 10/1998 | Hatch | C08G 18/4018 473/376 |
| 5,820,491 | A * | 10/1998 | Hatch | A63B 37/0003 473/378 |
| 5,840,788 | A * | 11/1998 | Lutz | A63B 37/0003 40/327 |
| 5,863,646 | A | 1/1999 | Verardi et al. | |
| 5,880,190 | A | 3/1999 | Laura | |
| 6,210,758 | B1 * | 4/2001 | McNeil | B05D 7/57 427/409 |
| 6,342,558 | B1 * | 1/2002 | Grandhee | C08F 283/006 524/457 |
| 6,437,036 | B1 * | 8/2002 | Gessner | C08G 18/0819 427/388.3 |
| 6,794,027 | B1 * | 9/2004 | Araki | C09D 127/18 427/385.5 |
| 7,115,050 | B2 * | 10/2006 | Andre | C09D 183/04 473/377 |
| 7,247,697 | B2 * | 7/2007 | Hogge | C09D 175/16 473/371 |
| 7,858,698 | B2 | 12/2010 | Laura et al. | |
| 7,867,419 | B2 * | 1/2011 | Ohira | A63B 45/00 156/153 |
| 8,096,899 | B2 | 1/2012 | Kim et al. | |
| 8,241,150 | B2 | 8/2012 | Stefan et al. | |
| 8,466,218 | B2 | 6/2013 | December et al. | |
| 8,575,278 | B2 | 11/2013 | Kim et al. | |
| 2002/0082358 | A1 * | 6/2002 | Ohira | C08G 18/38 525/418 |
| 2003/0134970 | A1 * | 7/2003 | Crumley | C08G 18/0823 524/589 |
| 2003/0187152 | A1 * | 10/2003 | Shimura | C08G 18/10 525/450 |
| 2004/0266555 | A1 | 12/2004 | Park et al. | |
| 2008/0280699 | A1 | 11/2008 | Jarvholm | |
| 2010/0179002 | A1 | 7/2010 | Kim et al. | |
| 2010/0285308 | A1 | 11/2010 | Merritt et al. | |
| 2011/0152010 | A1 | 6/2011 | Kim et al. | |
| 2013/0017906 | A1 | 1/2013 | Kim et al. | |

OTHER PUBLICATIONS

International Preliminary Report on Patentability of the IPEA in connection with International Patent Application No. PCT/US2015/012056 dated Feb. 1, 2016.

* cited by examiner

FIG. 3

GOLF BALL AND METHOD OF COATING A COVER OF THE GOLF BALL

TECHNICAL FIELD

The present disclosure relates to a golf ball and a method of coating a cover of the golf ball.

BACKGROUND

Golf balls generally include a core and a durable cover surrounding the core. The core may be formed from any number of constructions and materials. For example, the core may include a rubber wound core or multiple core layers. Further, the durable cover may be coated with a cured coating layer formed from a topcoat coating composition. The cured coating layer may provide the golf ball with specific characteristics such as gloss, color, durability, and spin during flight. Since golf balls may be used by golfers of various playing abilities and under various playing conditions, the cured coating layer may be exposed to sunlight, extreme temperature ranges, repeated stresses from impact with a golf club, and potential contact with hard, abrasive surfaces during play.

SUMMARY

A golf ball comprises a core, a cover formed from an ionomer resin and disposed on the core, and a cured coating layer disposed on and in direct contact with the cover. The ionomer resin may be a copolymer of an olefin monomer and an unsaturated dicarboxylic acid having from 3 carbon atoms to 12 carbon atoms. The cured coating layer is formed from a topcoat coating composition comprising a polymeric component and a halogenated component present in an amount of from about 0.5 parts by weight to about 50 parts by weight based on 100 parts by weight of the polymeric component. Therefore, the golf ball may be free from an intermediary layer disposed between the cured coating layer and the cover.

The halogenated component may be present in an amount of from about 0.5 parts by weight to about 50 parts by weight based on 100 parts by weight of the polymeric component. In one variation, the halogenated component may be present in an amount of from about 10 parts by weight to about 50 parts by weight based on 100 parts by weight of the polymeric component. The halogenated component may be a halogenated polyolefin such as a chlorinated polyolefin.

Alternatively, the halogenated component may be present in an amount of from about 0.5 parts by weight to about 10 parts by weight based on 100 parts by weight of the polymeric component. The halogenated component may be a halogenated acid such as a chlorinated acid. Further, the halogenated component may comprise a halogenated polyolefin and an unsaturated dicarboxylic acid.

In one embodiment, the topcoat coating composition is a polyurethane coating composition.

The topcoat coating composition may comprise a solvent component present in an amount of from about 10 parts by weight to about 50 parts by weight based on 100 parts by weight of the topcoat coating composition. The solvent component may comprise at least one aromatic solvent. The at least one aromatic solvent may be present in an amount of from about 50 parts by weight to about 80 parts by weight based on 100 parts by weight of the solvent component. In another embodiment, the solvent component may comprise at least one nitrogen-containing solvent.

A method of coating a cover of a golf ball includes applying a topcoat coating composition directly onto the cover. The topcoat coating composition comprises a polymeric component and a halogenated component present in an amount of from about 0.5 parts by weight to about 50 parts by weight based on 100 parts by weight of the polymeric component. The method further includes, after applying, curing the topcoat coating composition to form a cured coating layer disposed on and in direct contact with the cover to thereby coat the cover.

Applying may include enclosing the cover such that the golf ball is free from an intermediary layer disposed between the cured coating layer and the cover.

Golf balls formed by the method may have excellent physical properties. In particular, the cured coating layer has excellent adhesion to the cover due to the halogenated component of the topcoat coating composition. Therefore, the cured coating layer may not peel, delaminate, or chip when the golf ball is exposed to sunlight or used during prolonged play. For example, as the golf ball is deformed slightly after the golf ball is struck by a golf club during play, the cured coating layer may also suitably deform and may therefore adequately adhere to the cover. The golf balls may also have excellent gloss, color, and durability. In addition, the golf balls may exhibit excellent durability over an operating life and excellent spin during flight.

Further, since the golf balls formed by the method may omit an intermediary layer such as a primer layer, an adhesive layer, or an adhesion promoter layer disposed between the cured coating layer and the cover, the golf balls may be economical to manufacture.

As used herein, the terms "a," "an," "the," "at least one," and "one or more" are interchangeable and indicate that at least one of an item is present. A plurality of such items may be present unless the context clearly indicates otherwise. All numerical values of parameters (e.g., of quantities or conditions) in this disclosure, including the appended claims, are to be understood as being modified in all instances by the term "about" whether or not "about" actually appears before the numerical value. "About" indicates that the stated numerical value allows some slight imprecision (e.g., with some approach to exactness in the value; approximately or reasonably close to the value; nearly). If the imprecision provided by "about" is not otherwise understood with this meaning, then "about" as used herein indicates at least variations that may arise from methods of measuring and using such parameters. In addition, disclosure of ranges includes disclosure of all values and further divided ranges within the entire range. Each value within a range and the endpoints of a range are all disclosed as separate embodiments. In this disclosure, for convenience, "polymer" and "resin" are used interchangeably to encompass resins, oligomers, and polymers. The terms "comprises," "comprising," "includes," "including," "has," and "having" are inclusive and therefore specify the presence of stated items, but do not preclude the presence of other items. As used in this disclosure, the term "or" includes any and all combinations of one or more of the listed items. When the terms "first," "second," "third," etc. are used to differentiate various items from one another, these designations are merely for convenience and do not limit the items.

The above features and advantages and other features and advantages of the present disclosure are readily apparent from the following detailed description of the best modes for

DETAILED DESCRIPTION

Figure 1:
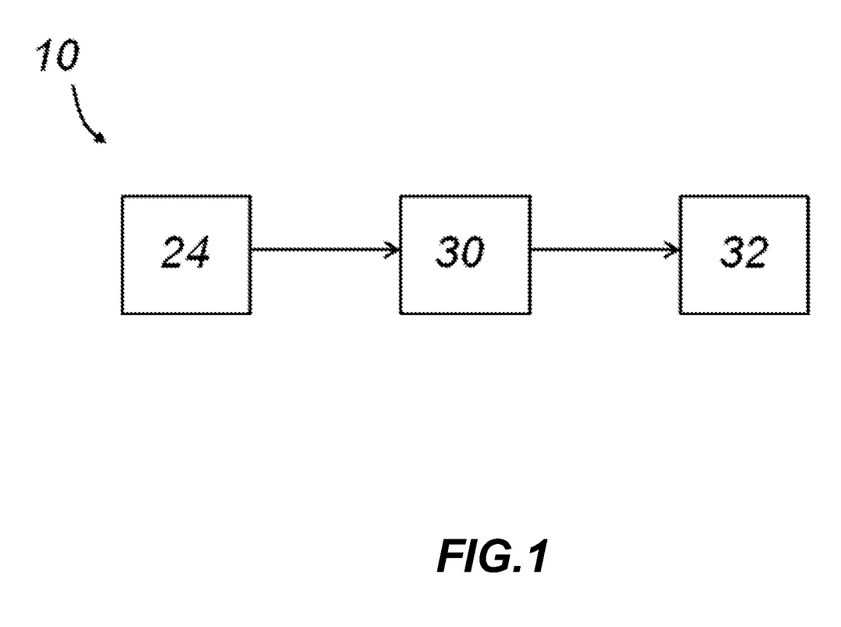
FIG. 1 is a flowchart of a method of coating a cover of a golf ball.

Referring to the Figures, wherein like reference numerals refer to like elements, a method 10 of coating a cover 12 (FIG. 2) of a golf ball 14 (FIG. 2) is shown generally in FIG. 1. The method 10 forms a cured coating layer 16 (FIGS. 2 and 3) disposed on the cover 12. The cured coating layer 16 has excellent adhesion to the cover 12 such that the cured coating layer 16 may not delaminate or peel from the cover 12. Advantageously, the golf ball 14 may omit, i.e., not include, an intermediary layer such as a primer layer or an adhesive layer or an adhesion-promoting layer disposed between the cured coating layer 16 and the cover 12. Nonetheless, the golf ball 14 formed by the method 10 may exhibit excellent durability and appearance over an operating life.

Figure 2:
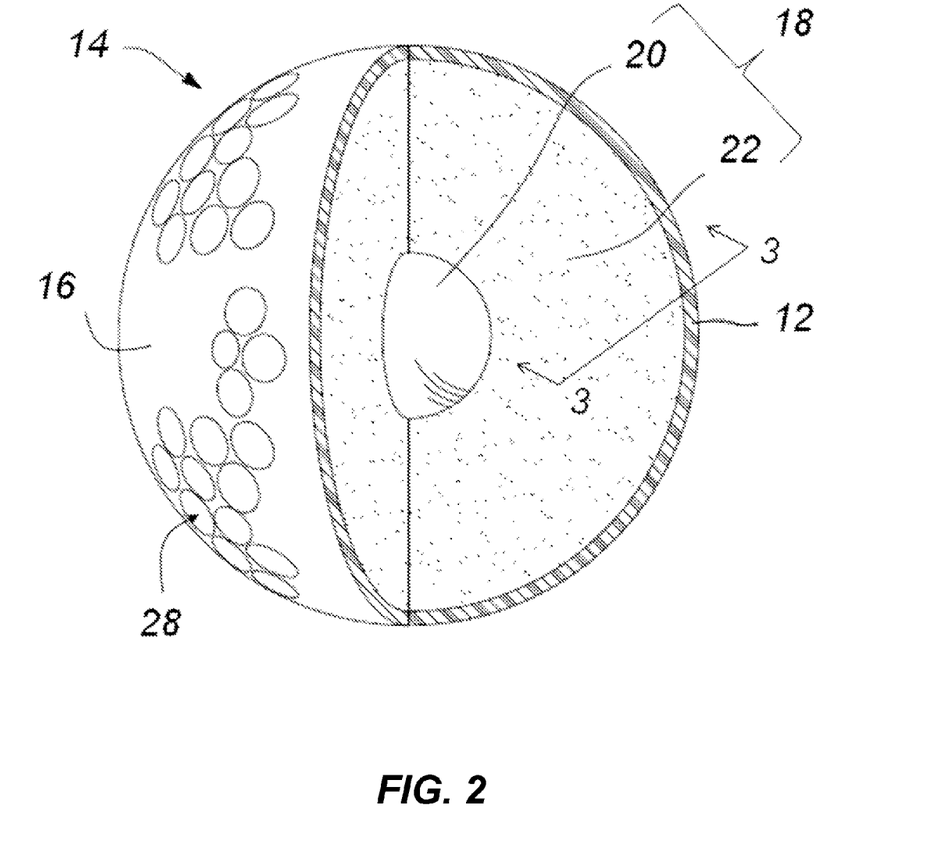
FIG. 2 is a schematic, enlarged illustration of a partial cross-sectional view of the golf ball formed by the method of FIG. 1.

As best shown in FIG. 2, the golf ball 14 includes a core 18 and the cover 12 disposed on the core 18. That is, the golf ball 14 may have a multi-layer construction such that the cover 12 may enclose the core 18. Further, the core 18 may be an elastic center of the golf ball 14 and may include a core center 20 and one or more core layers 22 disposed on the core center 20. While FIG. 2 generally illustrates a golf ball 14 having a three-piece construction, i.e., the core center 20, the one or more core layers 22, and the cover 12, the described structure and method 10 may be equally applicable to four-piece golf balls (not shown) or five- or more-piece golf balls (not shown).

Further, referring again to FIG. 2, once the golf ball 14 is completely assembled, each layer, e.g., the core center 20, the one or more core layers 22, and the cover 12, may be substantially concentric with every other layer such that every layer shares a common geometric center. Additionally, a mass distribution of each layer may be uniform such that a center of mass for each layer and the golf ball 14 as a whole may be coincident with the geometric center.

The core 18 may be formed from any suitable material. For example, the core 18 may be formed from an ionomer, a polymer, a cured product of a rubber composition, and combinations thereof. In addition, for embodiments including the core center 20 and the one or more core layers 22, the core center 20 and the one or more core layers 22 may also be formed from an ionomer, a polymer, a cured product of a rubber composition, and combinations thereof. For example, the one or more core layers 22 may be formed from, a resin such as a polyurethane resin, an ionomer resin, a polyamide resin, polyethylene resin, and combinations thereof or an elastomer such as a styrene elastomer, a polyolefin elastomer, a polyurethane elastomer, a polyester elastomer, a cured product of a rubber composition, and combinations thereof.

Referring again to FIG. 1, once the core 18 (FIG. 2) is formed, the method 10 may include positioning 24 the cover 12 (FIG. 2) onto the core 18 via, for example, injection molding, casting, or compression molding. For example, the core 18 may be prefabricated and placed into a cavity defined by a mold, and the cover 12 may be injection molded directly onto the core 18. Alternatively, a pair of hemispherical covers (not shown) may be pre-molded by die casting, and the core 18 may be placed into and enclosed by the pair of hemispherical covers. Subsequently, the pair of hemispherical covers may be compression molded at a temperature of from about 120° C. to about 170° C. for a duration of from about 1 minute to about 5 minutes to thereby attach the cover 12 to the core 18.

The core 18 may also be surface-treated before the cover 12 is attached to the core 18 to ensure sufficient adhesion between the cover 12 and the core 18. Suitable surface treatments may include mechanical abrasion, chemical abrasion, corona discharge, plasma treatment, and/or application of an adhesion promoter such as a silane or an adhesive to the core 18 before positioning 24 (FIG. 1) the cover 12.

As best shown in FIG. 2, the cover 12 may define an outermost portion 26 (FIG. 3) of the golf ball 14, and may define any desired number and configuration of dimples 28. For example, the golf ball 14 may define from 280 dimples 28 to 432 dimples 28 or from 300 dimples 28 to 392 dimples 28 or from 298 dimples 28 to 360 dimples 28. Generally, the dimples 28 may decrease an aerodynamic drag of the golf ball 14 during flight and may provide the golf ball 14 with increased flight distance when the golf ball 14 is properly struck during play. Further, the dimples 28 may have any suitable shape including, for example, a circle or a polygon. Also, spacing between each dimple 28 may be selected according to desired aerodynamic characteristics of the golf ball 14.

With continued reference to FIG. 2, the cover 12 is formed from an ionomer resin. The ionomer resin may be selected to provide the golf ball 14 with toughness, durability, and a desired hardness. The ionomer resin may be a copolymer of an olefin monomer, e.g., an alkene, and an unsaturated mono- or dicarboxylic acid having from 3 carbon atoms to 12 carbon atoms. The ionomer resin may also include a softening monomer such as a mono- or dicarboxylic acid ester. The acid groups of the ionomer resin may be neutralized to various degrees by the addition of a neutralizing agent such as a metal cation or salt so that the ionomer resin may include both covalent and ionic bonds.

In one example, the ionomer resin may be a copolymer of an alpha-olefin monomer, such as ethylene, and an $\alpha,\beta$-ethylenically unsaturated carboxylic acid having from 3 carbon atoms to 8 carbon atoms, such as acrylic acid or methacrylic acid. The $\alpha,\beta$-ethylenically unsaturated carboxylic acid may be present in the ionomer resin in an amount of from about 4 parts by weight or from about 6 parts by weight or from about 8 parts by weight to about 35 parts by weight or about 20 parts by weight based on 100 parts by weight of the ionomer resin.

The softening monomer may be an alkyl acrylate or methacrylate such as an alkyl acrylate or methacrylate ester having from 1 carbon atom to 8 carbon atoms. The softening monomer may be present in an amount of from about 5 parts by weight or from about 11 parts by weight to about 50 parts by weight or about 35 parts by weight or about 23 parts by weight based on 100 parts by weight of the ionomer resin.

Nonlimiting specific examples of ionomer resins include copolymers of ethylene/acrylic acid/n-butyl acrylate; ethylene/methacrylic acid/n-butyl acrylate; ethylene/methacrylic acid/isobutyl acrylate; ethylene/acrylic acid/isobutyl acrylate; ethylene/methacrylic acid/n-butyl methacrylate; ethylene/acrylic acid/methyl methacrylate; ethylene/acrylic acid/ methyl acrylate; ethylene/methacrylic acid/methyl acrylate; ethylene/methacrylic acid/methyl methacrylate; and ethylene/acrylic acid/n-butyl methacrylate. Preferred ionomer resins may include copolymers of ethylene/methacrylic acid/n-butyl acrylate; ethylene/acrylic acid/n-butyl acrylate; ethylene/methacrylic acid/methyl acrylate; ethylene/acrylic acid/ethyl acrylate; ethylene/methacrylic acid/ethyl acrylate; and ethylene/acrylic acid/methyl acrylate. In various embodiments, the most preferred ionomer resins may include ethylene/(meth)acrylic acid/n-butyl acrylate; ethylene/(meth)acrylic acid/ethyl acrylate; and ethylene/(meth)acrylic acid/methyl acrylate copolymers.

The α,β-ethylenically unsaturated carboxylic acid of the ionomer resin may be neutralized by any neutralizing agent. Suitable neutralizing agents may include metal cations such as lithium cations, sodium cations, potassium cations, magnesium cations, calcium cations, barium cations, lead cations, tin cations, zinc cations, aluminum cations, and combinations thereof. In various embodiments, alkali metal, alkaline earth metal, or zinc cations may be particularly preferred. The neutralizing agent may neutralize from about 10% or from about 20% or from about 30% or from about 40% or from about 50% to about 60% or to about 70% or to about 75% or to about 80% or to about 90% of the α,β-ethylenically unsaturated carboxylic acid.

Suitable ionomer resins are commercially available from DuPont of Wilmington, Del. under the trademark Surlyn® and may have a hardness of from about 35 Shore D to about 70 Shore D.

Figure 3:
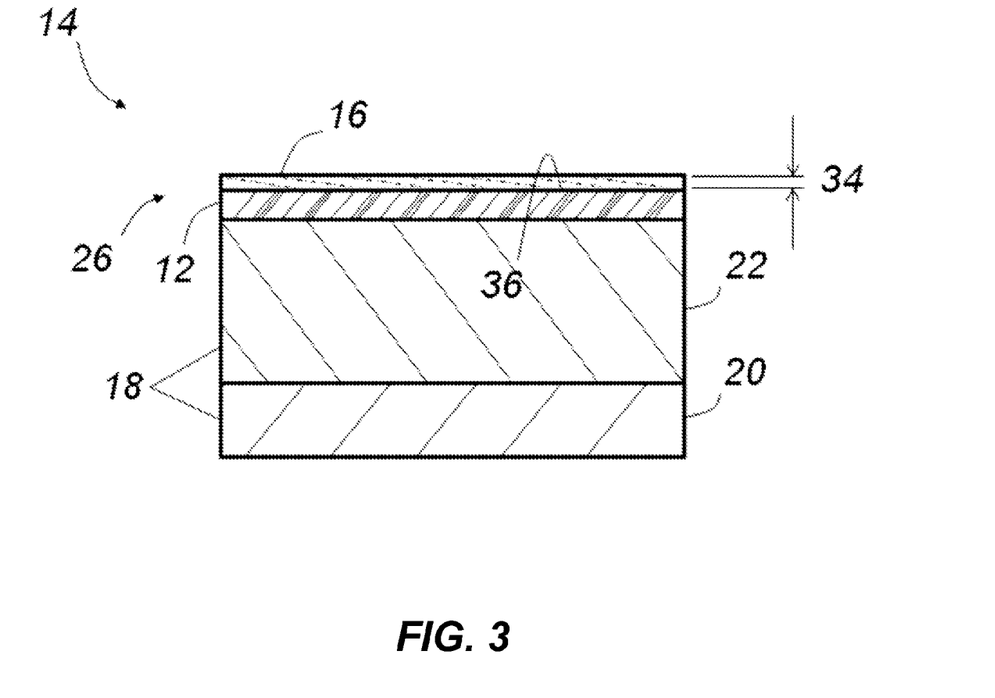
FIG. 3 is a schematic illustration of a cross-sectional view of the golf ball of FIG. 2 taken along section lines 3-3.

Referring now to FIGS. 1 and 3, the method 10 includes applying 30 (FIG. 1) a topcoat coating composition directly onto the cover 12. The method 10 also includes, after applying 30, curing 32 (FIG. 1) the topcoat coating composition to form the cured coating layer 16 (FIGS. 2 and 3) disposed on and in direct contact with the cover 12 to thereby coat the cover 12.

Applying 30 may include enclosing the cover 12 such that the golf ball 14 is free from an intermediary layer (not shown) disposed between the cured coating layer 16 and the cover 12. That is, the golf ball 14 may omit a primer layer (not shown), an adhesive layer (not shown), or an adhesion promoter layer (not shown) disposed between the cured coating layer 16 and the cover 12. Rather, as best shown in FIG. 3, the cured coating layer 16 is disposed on and in direct contact with the cover 12. The cured coating layer 16 may enclose the cover 12. The cured coating layer 16 may have a thickness 34 (FIG. 3) of from about 5 µm to about 100 µm. For example, the thickness 34 of the cured coating layer 16 may be from about 10 µm or from about 15 µm to about 75 µm or to about 50 µm or to about 25 µm or to about 20 µm.

In one embodiment of the method 10, applying 30 (FIG. 1) may include spraying the topcoat coating composition directly onto the cover 12. For example, the topcoat coating composition or one or more components of the topcoat coating composition may be supplied to and/or mixed within an air gun and subsequently sprayed directly onto the cover 12. In another embodiment, applying 30 may include submerging the cover 12 in the topcoat coating composition. For example, the cover 12 may be submersed in a dip tank (not shown) containing the topcoat coating composition so that the topcoat coating composition surrounds and coats the cover 12.

After the topcoat coating composition is disposed on the cover 12, the cured coating layer 16 is formed by curing 32 (FIG. 1) the topcoat coating composition. Curing 32 may include elevating a temperature of the topcoat coating composition. For example, curing 32 may include heating the topcoat coating composition at a temperature of from about 55° C. to about 70° C. for a duration of from about 10 minutes to about 4 hours. In one specific non-limiting example, curing 32 may include heating the topcoat coating composition at a temperature of about 65° C. for a duration of about 20 minutes. In one embodiment, curing 32 may include baking the topcoat coating composition in an oven (not shown).

Referring again to FIG. 3, the cured coating layer 16 is formed from the topcoat coating composition. The topcoat coating composition may be any suitable topcoat coating composition such as, but not limited to, polyurethane coating compositions, polyurethane/polyurea coating compositions, acrylic coating compositions, vinyl coating compositions, polyester coating compositions, polyether coating compositions, epoxy coating compositions, melamine coating compositions, and combinations of these coating compositions. For example, the topcoat coating composition may be a polyester-polyurethane coating composition, an acrylic-polyurethane coating composition, or a polyether-polyurethane coating composition. Therefore, the topcoat coating composition includes a polymeric component or resinous vehicle such as a polyurethane, an acrylic, a vinyl, a polyester, a polyether, an epoxy, a melamine, and combinations thereof. That is, the polymeric component may be a resinous or polymeric portion of the topcoat coating composition. As such, the topcoat coating composition may include functional groups such as, but not limited to, hydroxyl functional groups, carboxyl functional groups, carbamate functional groups, urea functional groups, epoxide functional groups, primary amine functional groups, secondary amine functional groups, amido functional groups, thiol functional groups, silane functional groups, and combinations thereof.

The topcoat coating composition includes a halogenated component present in an amount of from about 0.5 parts by weight to about 50 parts by weight based on 100 parts by weight of the polymeric component. The halogenated component may be present in the topcoat coating composition in an amount to provide the cured coating layer 16 with excellent adhesion to the cover 12, even though the golf ball 14 may omit or not include a primer layer (not shown) or an adhesive layer (not shown). Without intending to be limited by theory, the halogen component may decrease or prevent a migration of antiadherent moieties of the ionomer resin to a surface 36 (FIG. 3) of the cover 12, and may in turn provide excellent bonding and adhesion of the cured coating layer 16 to the cover 12. That is, an ethylenic nature of the ionomer resin of the cover 12 may normally encourage certain antiadherent moieties to congregate at the surface 36, which may create the low-energy surface 36 to which the cured coating layer 16 must adhere. However, the halogen component of the topcoat coating composition may compensate for the low-energy surface 36 by mitigating the migration of the antiadherent moieties to the surface 36. Additionally or alternatively, the halogen component may bond to the surface 36 of the cover 12 via hydrogen bonding or van der Waals forces.

In one embodiment, the halogenated component may be present in an amount of from about 10 parts by weight to about 50 parts by weight based on 100 parts by weight of the polymeric component. For example, the halogenated component may be present in an amount of from about 20 parts by weight to about 40 parts by weight based on 100 parts by weight of the polymeric component. Alternatively, the halogenated component may be present in an amount of from about 25 parts by weight to about 50 parts by weight based on 100 parts by weight of the polymeric component. That is, the halogenated component may be present in an amount of from about 10 parts by weight or from about 15 parts by weight or from about 20 parts by weight or from about 25 parts by weight or from about 30 parts by weight or from about 35 parts by weight or from about 40 parts by weight or from about 45 parts by weight or about 50 parts by weight based on 100 parts by weight of the polymeric component.

For this embodiment, the halogenated component may be a halogenated polyolefin. Suitable nonlimiting examples of the halogenated polyolefin may include fluorinated polyolefins, chlorinated polyolefins, and brominated polyolefins. Further, the halogenated polyolefin may be a grafted or ungrafted polyolefin, such as, without limitation, halogenated polyethylene, halogenated polypropylene, and combinations thereof.

Suitable ungrafted polyolefins may be homopolymers of alpha-mono-olefins having from 2 carbon atoms to 8 carbon atoms. Suitable grafted polyolefins may be a reaction product of an alpha-olefin polymer and a grafting agent. The alpha-olefin polymer may include homopolymers such as polyethylene and polypropylene; and copolymers such as ethylene/propylene copolymers, ethylene/l-butene copolymers, ethylene/4-methyl-1-pentene copolymers, ethylene/l-hexene copolymers, ethylene/1-butene/l-octene copolymers, ethylene/l-decene copolymers, ethylene/4-ethyl-1-hexene copolymers, and ethylene/4-ethyl-1-octene copolymers.

For example, chlorinated grafted polypropylene may be prepared by solution chlorination of a graft-modified polypropylene homopolymer or propylene/alpha-olefin copolymer. Such solution chlorination and graft polymerization may be conducted in the presence of a free radical catalyst in a solvent which is inert to chlorination. Examples of such solvents may include fluorobenzene, chlorofluorobenzene, carbon tetrachloride, chloroform, and the like. Typically, such grafted polypropylenes are base polymers that have been grafted with an $\alpha,\beta$-unsaturated polycarboxylic acid or an acid anhydride to form an acid- and/or anhydride-modified chlorinated polyolefin. Suitable grafting agents generally include maleic acid or anhydride, fumaric acid, and the like.

The halogenated polyolefin, e.g., the chlorinated polyolefin, may be modified with an acid or anhydride functional group. Nonlimiting examples of unsaturated acids that may be used to prepare a modified, chlorinated polyolefin include acrylic acid, methacrylic acid, maleic acid, citraconic acid, fumaric acid, and the anhydrides of these acids. An acid content of the chlorinated polyolefin may be from about 0.5 parts by weight to about 6 parts by weight and more preferably from about 1 part by weight to about 3 parts by weight based on 100 parts by weight of the chlorinated polyolefin. The chlorinated polyolefin may have an acid number of from about 50 mg KOH/g to about 100 mg KOH/g. Also, the chlorinated polyolefin may be a chlorosulfonated olefin polymer or a blend of a chlorinated polyolefin with the chlorosulfonated olefin polymer, where chlorosulfonation may be effected by reaction of the grafted or non-grafted base polymer with a chlorosulfonating agent.

The chlorinated polyolefin may include chlorine present in an amount of from about 18 parts by weight to about 23 parts by weight based on 100 parts by weight of the chlorinated polyolefin. That is, the chlorinated polyolefin may include chlorine present in an amount of from about 19 parts by weight or from about 20 parts by weight or from about 21 parts by weight or from about 22 parts by weight or about 23 parts by weight based on 100 parts by weight of the chlorinated polyolefin. Without intending to be limited by theory, chlorine present in the described amount may provide the cured coating layer 16 with excellent adhesion to the cover 12 and may improve surface bonding of the cured coating layer 16.

In one embodiment, the halogenated component is chlorinated polyethylene and includes chlorine present in an amount of from about 19 parts by weight to about 22 parts by weight based on 100 parts by weight of the chlorinated polyethylene. In another embodiment, the halogenated component is chlorinated polypropylene. A specific example of a halogenated component is commercially available from Eastman™ of Kingsport, Tenn. under the trademark Eastman™ Chlorinated Polyolefin 343-1.

In another embodiment, the halogenated component may be present in an amount of from about 0.5 parts by weight to about 10 parts by weight based on 100 parts by weight of the polymeric component. For example, the halogenated component may be present in an amount of from about 1 part by weight to about 8 parts by weight based on 100 parts by weight of the polymeric component. Alternatively, the halogenated component may be present in an amount of from about 5 parts by weight to about 10 parts by weight based on 100 parts by weight of the polymeric component. That is, the halogenated component may be present in an amount of from about 2 parts by weight or from about 3 parts by weight or from about 4 parts by weight or from about 5 parts by weight or from about 6 parts by weight or from about 7 parts by weight or from about 8 parts by weight or from about 9 parts by weight or about 10 parts by weight based on 100 parts by weight of the polymeric component.

For this embodiment, the halogenated component may be a halogenated acid. Suitable nonlimiting examples of the halogenated acid may include fluorinated acids, chlorinated acids, and brominated acids. For example, the halogenated component may be a chlorinated acid such as trichloroisocyanuric acid or chlorosulfonic acid.

In another embodiment, the halogenated component may include a halogenated polyolefin, such as any of the halogenated polyolefins set forth above, and a halogenated acid. In one variation, the halogenated component may include a chlorinated polyolefin and a chlorinated acid. More specifically, the halogen component may include chlorinated polyethylene and trichloroisocyanuric acid. Alternatively, the halogen component may include chlorinated polypropylene and trichloroisocyanuric acid. In another example, the halogenated component may include chlorinated polyethylene and chlorosulfonic acid. Alternatively, the halogenated component may include chlorinated polypropylene and chlorosulfonic acid.

In yet another embodiment, the halogenated component may include a halogenated polyolefin, such as any of the halogenated polyolefins set forth above, and an unsaturated dicarboxylic acid. More specifically, the halogenated component may include chlorinated polyethylene and fumaric acid. Alternatively, the halogenated component may include chlorinated polypropylene and fumaric acid.

The topcoat coating composition may be a two-part coating system. For example, the topcoat coating composition may include 1) a first part comprising a polyol, a polyamine, or another compound containing an active hydrogen atom, and 2) a second part comprising a polyisocyanate having at least two —N=C=O functional groups. In one embodiment, the topcoat coating composition is a polyurethane coating composition. As used herein, the terminology "polyurethane" refers to materials prepared by reaction of a polyisocyanate and a polyol. In another embodiment, the topcoat coating composition may be a polyurea coating composition. Therefore, the topcoat coating composition may include at least one polyisocyanate and at least one polymeric polyol or polyamine reactive with the at least one polyisocyanate.

Suitable polyisocyanates may include any aromatic, aliphatic, or cycloaliphatic polyioscyanates or oligomers thereof. Nonlimiting examples of suitable polyisocyanates include 2,2'-, 2,4'-, and 4,4-diphenylmethane diisocyanate and isomeric mixtures thereof; polyphenylene polymethylene polyisocyanates (poly-MDI, PMDI); 2,4- and 2,6-toluene diisocyanates (TDI), and isomeric mixtures thereof such as an 80:20 mixture of the 2,4- and 2,6-isomers; isophorone diisocyanate; 1,4-diisocyanatobutane; 1,5-diisocyanatopentane; 1,6-diisocyanatohexane; 1,4-cyclohexane diisocyanate; cycloaliphatic analogs of PMDI; dicyclohexylmethane diisocyanate (MDI); ethylene diisocyanate; 1,2-diisocyanatopropane; 1,3-diisocyanatopropane; 1,6-diisocyanatohexane (hexamethylene diisocyanate or HDI); 1,4-butylene diisocyanate; lysine diisocyanate; 1,4-methylene bis-(cyclohexyl isocyanate) (also known as $_{H12}$MDI); various isomers of toluene diisocyanate (2,6-TDI and 2,4-TDI); meta-xylylenediiosycyanate (mXDI); para-xylylenediisocyanate (pXDI); 4-chloro-1,3-phenylene diisocyanate; 1,5-tetrahydro-naphthalene diisocyanate; 4,4'-dibenzyl diisocyanate; 1,2,4-benzene triisocyanate; α,α,α',α'-tetramethylxylylene diisocyanate (TMXDI); biurets, allophanates, isocyanurates, uretdiones, and prepolymers of these described polyisocyanates, and combinations thereof. A suitable polyisocyanate is commercially available from Bayer Corporation of Leverkusen, Germany under the trademark DESMODUR®.

Suitable polymeric polyols may include polyester polyols, polyether polyols, and polycarbonate polyols. Nonlimiting examples of suitable polyester polyols may be produced by a reaction of dicarboxylic acids and diols or esterifiable derivatives thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerine, trimethylolpropanes, tripropylene glycol, tetraethylene glycol, tetrapropylene glycol, tetramethylene glycol, 1,4-cyclohexane-dimethanol, and the like.

Nonlimiting examples of suitable polyether polyols may be prepared by a ring-opening addition polymerization of an alkylene oxide with an initiator of a polyhydric alcohol. Nonlimiting examples of suitable polyether polyols may include polypropylene glycol (PPG), polyethylene glycol (PEG), and polytetramethylene ether glycol (PTMEG). Block copolymers such as combinations of polyoxypropylene and polyoxyethylene glycols, poly-1,2-oxybutylene and polyoxyethylene glycols, and poly-1,4-tetramethylene and polyoxyethylene glycols may also be suitable.

Nonlimiting examples of suitable polycarbonate polyols may be prepared through a condensation reaction of diols with phosgene, chloroformic acid ester, dialkyl carbonate, or diallyl carbonate. Nonlimiting examples of diols may include ethanediol, diethylene glycol, 1,3-butanediol, 1,4-butanediol, 1,6-hexanediol, neopentylglycol, and 1,5-pentanediol.

Suitable chain extenders for production of the polymeric polyols may include ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neopentyl glycol, dihydroxyethoxy hydroquinone, 1,4-cyclo-hexanedimethanol, 1,4-dihydroxycyclohexane, and the like.

In addition to the diol chain extenders set forth above, diamines and amino alcohols may also be useful chain extenders. Examples of suitable diamines include aliphatic, cyclolaliphatic, or aromatic diamines. In particular, a diamine chain extender may include ethylene diamine, hexamethylene diamine, 1,4-cyclohexyene diamine, benzidine, toluene diamine, diaminodiphenyl methane, and the isomers of phenylene diamine or hydrazine. Aromatic amines may also be used, such as MOCA (4,4'-methylene-bis-o-chloroaniline), M-CDEA (4,4'-methylenebis(3-chloro-2-6-diethyllaniline)). Examples of suitable amino alcohols include ethanol amine, N-methylethanolamine, N-butylethanolamine, N-oleyethanolamine, N-cyclohexylisopropanolamine, and the like. Mixtures of various types of chain extenders may also be used to produce the polymeric polyols.

Optionally, the topcoat coating composition may include further components such as fillers and/or additives. Fillers and/or additives may be included to provide the topcoat coating composition with desired characteristics such as enhanced physical properties and UV light resistance. For example, to improve UV light resistance, the topcoat coating composition may include at least one light stabilizer. Light stabilizers may include hindered amines, UV stabilizers, or a mixture thereof.

Inorganic or organic fillers may be also added to the topcoat coating composition. Suitable inorganic fillers may include silicate minerals, metal oxides, metal salts, clays, metal silicates, glass fibers, natural fibrous minerals, synthetic fibrous minerals or mixtures thereof.

The topcoat coating composition may further include a catalyst component. The catalyst component may increase a rate of curing 32 (FIG. 1) of the topcoat coating composition to form the cured coating layer 16 (FIGS. 2 and 3). The catalyst component may include dibutyl tin dilauate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, detrabutyl titanate, tertiary amines, mercaptides, stannous octoate, potassium octoate, zinc octoate, diaza compounds, bismuth compounds, and potassium acetate.

For embodiments including the polyurethane coating composition, an amount of the catalyst component present in the polyurethane coating composition may depend upon the selected catalyst, polymeric polyol, and polyisocyanate, as well as on the temperature and duration of curing 32 (FIG. 1). Generally, the catalyst component may be present in an amount sufficient to reduce a duration of curing 32 of the polyurethane coating composition.

The topcoat coating composition may be solvent-borne. That is, the topcoat coating composition may further include a solvent component present in an amount of from about 10 parts by weight to about 30 parts by weight based on 100 parts by weight of the topcoat coating composition. For example, the solvent component may be present in an amount of from about 20 parts by weight to about 40 parts by weight based on 100 parts by weight of the topcoat coating composition. Alternatively, the solvent component may be present in an amount of from about 25 parts by weight to about 50 parts by weight based on 100 parts by weight of the topcoat coating composition. That is, the solvent component may be present in an amount of from about 10 parts by weight or from about 15 parts by weight or from about 20 parts by weight or from about 25 parts by weight or from about 30 parts by weight or from about 35 parts by weight or from about 40 parts by weight or from about 45 parts by weight or about 50 parts by weight based on 100 parts by weight of the topcoat coating composition.

The solvent component may comprise at least one aromatic solvent. Suitable examples of the at least one aromatic solvent include benzene, ethylbenzene, xylene, toluene, aromatic naphthas, and combinations thereof. In one non-limiting example, the solvent component may include xylene and toluene. Such aromatic solvents may improve a flow of the topcoat coating composition during applying 30 (FIG. 1), e.g., during spraying or dipping. When present, the at least one aromatic solvent may be present in an amount of from about 50 parts by weight up to about 80 parts by weight based on 100 parts by weight of the solvent component. For example, the at least one aromatic solvent may be present in an amount of from about 55 parts by weight or from about 60 parts by weight or from about 65 parts by weight or from about 70 parts by weight or from about 75 parts by weight based on 100 parts by weight of the solvent component.

In another example, the solvent component may comprise at least one nitrogen-containing solvent. Suitable examples of nitrogen-containing solvents include N-methyl-2-pyrrolidone, dimethylformamide, pyridine, acetonitrile, and combinations thereof. In a specific non-limiting example, the solvent component may include N-methyl-2-pyrrolidone. Such nitrogen-containing solvents may evaporate relatively slowly during curing 32 (FIG. 1) of the topcoat coating composition and therefore may allow the cured coating layer 16 to sufficiently adhere to the cover 12.

In yet another example, the solvent component may comprise an oxygenated solvent. Suitable examples of oxygenated solvents include 2-ethylhexanol, 2-methyl butanol, diisobutyl carbinol, diisobuytl ketone, isobutanol, methyl isobutyl carbinol, methyl isobutyl ketone, n-butanol, n-pentanol, n-propanol, n-butyl acetate, n-butyl propionate, n-pentyl propionate, n-propyl propionate, and combinations thereof. Such oxygenated solvents may also evaporate relatively slowly during curing 32 (FIG. 1) of the topcoat coating composition and therefore may allow the cured coating layer 16 to sufficiently adhere to the cover 12.

In a further example, the solvent component may include at least one nitrogen-containing solvent, an oxygenated solvent, and at least one aromatic solvent. For example, the solvent component may include xylene, toluene, dimethylformamide, and N-methyl-2-pyrrolidone.

Therefore, in one specific embodiment, the topcoat coating composition may be a polyurethane coating composition and may include a polyurethane component and the chlorinated polyolefin present in an amount of from about 10 parts by weight to about 50 parts by weight based on 100 parts by weight of the polyurethane component. More specifically, the chlorinated polyolefin may be chlorinated polyethylene and may be present in an amount of from about 30 parts by weight to about 45 parts by weight based on 100 parts by weight of the polyurethane component. Further, the chlorinated polyethylene may include chlorine present in an amount of from about 19 parts by weight to about 22 parts by weight based on 100 parts by weight of the chlorinated polyethylene. In addition, the polyurethane coating composition may include the solvent component present in an amount of from about 10 parts by weight to about 50 parts by weight based on 100 parts by weight of the polyurethane coating composition. In particular, the solvent component may include at least one aromatic solvent present in an amount of from about 50 parts by weight based on 100 parts by weight of the solvent component.

Golf balls 14 formed by the method 10 may have excellent physical properties. For example, the cured coating layer 16 has excellent adhesion to the cover 12. In particular, the halogenated component of the topcoat coating composition may provide the cured coating layer 16 with excellent adhesion to the cover 12. Therefore, the cured coating layer 16 may not peel, delaminate, or chip when the golf ball 14 is exposed to sunlight or used during prolonged play. For example, as the golf ball 14 is deformed slightly after the golf ball 14 is struck during play, the cured coating layer 16 may also suitably deform and may therefore adequately adhere to the cover 12. The cured coating layer 16 may have an adhesion of from about 1.0 N/mm$^2$ to about 100 N/mm$^2$ as measured in accordance with the American Society for Testing and Materials (ASTM) D4541-09e1 test method.

The golf balls 14 formed by the method 10 may also have excellent gloss, color, and durability. Further, the cured coating layer 16 may have an elongation at break of from about 50% to about 500% as measured in accordance with the ASTM D412 test method. The cured coating layer 16 may also have a tensile strength of from about 500 N/mm$^2$ to about 5,000 N/mm$^2$ as measured in accordance with the ASTM D412 test method. The cured coating layer 16 may have an abrasion resistance of from about 100 mg/100 cycles to about 500 mg/100 cycles as measured using a 1 kilogram load and a H-18 grinding wheel rotated at 1,000 revolutions. In addition, the golf balls 14 may exhibit excellent durability over an operating life and excellent spin during flight.

Further, since the golf balls 14 may omit an intermediary layer such as a primer layer, an adhesive layer, or an adhesion promoter layer disposed between the cured coating layer 16 and the cover 12, the golf balls 14 may be economical to manufacture.

While the best modes for carrying out the disclosure have been described in detail, those familiar with the art to which this disclosure relates will recognize various alternative designs and embodiments for practicing the disclosure within the scope of the appended claims. It is intended that all matter contained in the above description or shown in the accompanying drawings shall be interpreted as illustrative only and not as limiting.

The invention claimed is:

1. A golf ball comprising:
   a core;
   a cover formed from an ionomer resin and disposed on the core; and
   a cured coating layer disposed on and in direct contact with the cover;
   wherein the cured coating layer is formed from a topcoat coating composition comprising a polymeric component and a halogenated component present in an amount of from about 0.5 parts by weight to about 50 parts by weight based on 100 parts by weight of the polymeric component;
   wherein the halogenated component comprises a chlorinated polyolefin, a chlorinated acid, or any combination thereof.

2. The golf ball of claim 1, wherein the golf ball is free from an intermediary layer disposed between the cured coating layer and the cover.

3. The golf ball of claim 1, wherein the halogenated component is present in an amount of from about 10 parts by weight to about 50 parts by weight based on 100 parts by weight of the polymeric component.

4. The golf ball of claim 3, wherein the halogenated component is a chlorinated polyolefin.

5. The golf ball of claim 1, wherein the halogenated component is present in an amount of from about 0.5 parts by weight to about 10 parts by weight based on 100 parts by weight of the polymeric component.

6. The golf ball of claim 5, wherein the halogenated component is a chlorinated acid.

7. The golf ball of claim 1, wherein the halogenated component comprises a chlorinated polyolefin and a chlorinated acid.

8. The golf ball of claim 1, wherein the ionomer resin is a copolymer of an olefin monomer and an unsaturated dicarboxylic acid having from 3 carbon atoms to 12 carbon atoms.

9. The golf ball of claim 1, wherein the topcoat coating composition is a polyurethane coating composition.

10. A method of coating a cover of a golf ball, the method comprising:
applying a topcoat coating composition directly onto the cover;
wherein the topcoat coating composition comprises a polymeric component and a halogenated component present in an amount of from about 0.5 parts by weight to about 50 parts by weight based on 100 parts by weight of the polymeric component;
wherein the topcoat coating composition comprises a solvent component present in an amount of from about 10 parts by weight to about 50 parts by weight based on 100 parts by weight of the topcoat coating composition wherein the solvent component comprises at least one nitrogen-containing solvent; and
after applying, curing the topcoat coating composition to form a cured coating layer disposed on and in direct contact with the cover to thereby coat the cover.

11. The method of claim 10, wherein the solvent component comprises at least one aromatic solvent.

12. The method of claim 11, wherein the at least one aromatic solvent is present in an amount of from about 50 parts by weight to about 80 parts by weight based on 100 parts by weight of the solvent component.

13. A method of coating a cover of a golf ball, the method comprising:
applying a topcoat coating composition directly onto the cover;
wherein the topcoat coating composition comprises a polymeric component and a halogenated component present in an amount of from about 0.5 parts by weight to about 50 parts by weight based on 100 parts by weight of the polymeric component; and
after applying, curing the topcoat coating composition to form a cured coating layer disposed on and in direct contact with the cover to thereby coat the cover;
wherein the halogenated component comprises a chlorinated polyolefin, a chlorinated acid, or a combination thereof.

14. The method of claim 13, wherein applying includes enclosing the cover such that the golf ball is free from an intermediary layer disposed between the cured coating layer and the cover.

* * * * *